(12) United States Patent
Himle et al.

(10) Patent No.: US 6,717,759 B1
(45) Date of Patent: Apr. 6, 2004

(54) HINDERING PTP IN A HARD DISK

(75) Inventors: Genevieve Himle, Boulder, CO (US);
Quinn Haddock, Longmont, CO (US);
Davide Guarisco, Palo Alto, CA (US);
Erhard Schreck, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/076,592

(22) Filed: Feb. 19, 2002

Related U.S. Application Data

(60) Provisional application No. 60/269,761, filed on Feb. 16, 2001.

(51) Int. Cl.$^7$ .............................. G11B 27/36; G11B 5/09
(52) U.S. Cl. ........................................... 360/31; 360/46
(58) Field of Search ............................ 360/31, 53, 46; 369/77.04

(56) References Cited

U.S. PATENT DOCUMENTS

| | | | | |
|---|---|---|---|---|
| 4,568,988 A | * | 2/1986 | McGinlay et al. | 360/77.02 |
| 4,935,828 A | * | 6/1990 | Frissell | 360/78.04 |
| 5,668,685 A | * | 9/1997 | Soeya et al. | 360/327.32 |
| 5,991,113 A | * | 11/1999 | Meyer et al. | 360/75 |
| 6,147,958 A | * | 11/2000 | Shido et al. | 369/126 |
| 6,160,368 A | * | 12/2000 | Plutowski | 318/375 |
| 6,172,858 B1 | * | 1/2001 | Yoda et al. | 360/313 |
| 6,292,321 B1 | * | 9/2001 | Miyake | 360/67 |
| 6,310,740 B1 | * | 10/2001 | Dunbar et al. | 360/46 |
| 6,510,025 B2 | * | 1/2003 | Narumi et al. | 360/126 |
| 6,519,105 B1 | * | 2/2003 | Takayama | 360/55 |

* cited by examiner

*Primary Examiner*—David Hudspeth
*Assistant Examiner*—Glenda P Rodriguez
(74) *Attorney, Agent, or Firm*—Anthony L. Miele; Palmer & Dodge, LLP

(57) ABSTRACT

A hard disk is provided with tools for limiting the duty cycle (a group of variations of load with time). The write current is controlled by, e.g., limiting the duration of a given write cycle. The write cycle may involve writing data continuously along adjacent portions of the disk media (e.g., writing of data in adjacent segments of a track in the outer diameter (OD) region of a platter), with an intermittent duty write current.

45 Claims, 4 Drawing Sheets

HINDERING PTP IN A HARD DISK

Priority is hereby claimed to U.S. Provisional Application No. 60/269,761, filed on Feb. 16, 2001, the content of which is hereby incorporated by reference in its entirety.

BACKGROUND OF THE INVENTION

Related Application Data

1. Copyright Notice

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

2. Field of the Invention

The present invention, in certain respects, may relate to hard disks. In other respects, the present invention may relate to a hard disk's read/write heads and to hindering pole tip protrusion (PTP).

3. Description of Background Information

Hard disks are being manufactured with increased access speeds and storage capacities. Manufacturers of these (present day and future) improved-performance hard disks have decreased the distance between the hard disk's read/write heads and its disk media. As a result, slight variations in the positioning or dimensions of the heads or of the disk media can cause the heads and the disk media to collide. For example, such a collision can be caused by protrusion of the pole tips of the write portion of a given read/write head, a phenomenon referred to as pole tip protrusion (PTP).

PTP can be caused by high frequency writing, which causes the thermal expansion of the pole tips. Such thermal expansion is caused by eddy current heating and coil heating. PTP can cause problems such as off-track writing (due to frictional forces) and high servo PES (due to the dragging of the head by the pole tip). PTP can result in drive failure.

SUMMARY OF THE INVENTION

The present invention is provided to hinder the occurrence of PTP in the write elements of hard disk read/write heads.

In accordance with one aspect of the invention, a hard disk is provided with tools for limiting the duty cycle (a group of variations of load with time). The write current is controlled by, e.g., limiting the duration of a given write cycle. The write cycle may involve writing data continuously along adjacent portions of the disk media (e.g., writing of data in adjacent segments of a track in the outer diameter (OD) region of a platter), with an intermittent duty write current. The invention may also be directed to any portion of such a hard disk or to any set or subset of acts performed by the hard disk. The invention may also be directed to computer readable media encoded to perform any acts disclosed herein.

In one embodiment, the write cycle is limited to a thermal time constant of approximately 0.5 to 1.0 msec. In another embodiment the write cycle is limited to a longer period, e.g., 2–100 msec.

BRIEF DESCRIPTION OF THE DRAWINGS

The present invention is further described in the detailed description which follows, by reference to the noted drawings, by way of non-limiting exemplary embodiments, in which like reference numerals represent similar parts throughout the several views of the drawings, and wherein.

DETAILED DESCRIPTION

Figure 1:
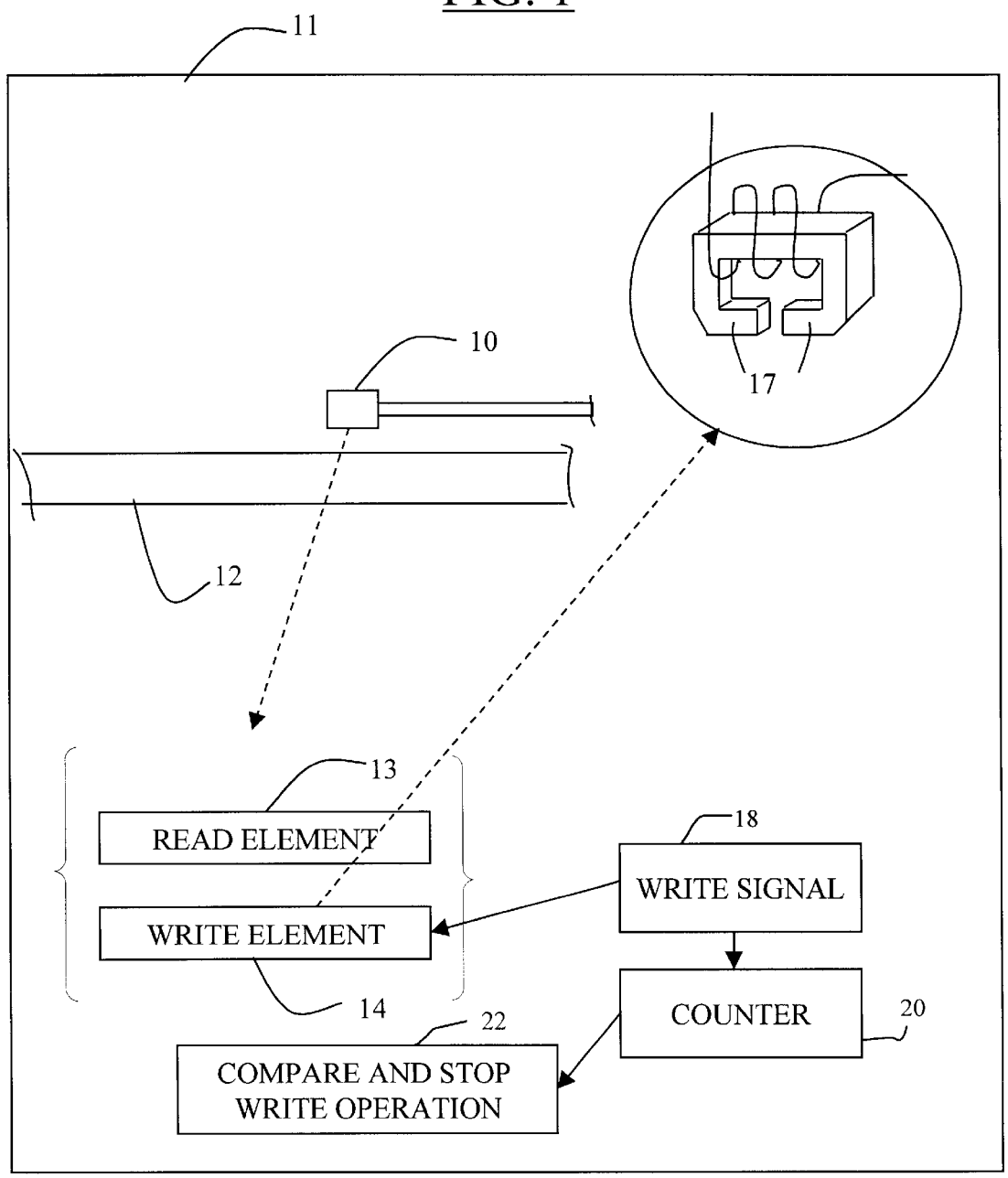
FIG. 1 is a schematic diagram illustrating certain elements of a hard disk, provided with mechanisms for limiting the duration of a given write cycle.

Referring now to the drawings in greater detail, FIG. 1 shows a hard disk having a unitary housing schematically depicted by a rectangle 11. Within the hard disk housing 11, disk media is provided, including a stack of disk platters (not shown). A given disk platter 12 is shown in the simplified diagram. For each side of a disk platter, a different read/write head 10 is provided. Each read/write head 10 may comprise a read element 13 and a write element 14. These elements are provided in some of the newer higher-performance hard disks which utilize a traditional U-shaped head for writing data onto the disk while using a magneto-resistive (MR) read element for reading data from-the disk media.

FIG. 1 includes an enlarged view of write element 14 comprising pole tips 17. Write element 14 comprises a U-shaped head made of conductive material. The U-shaped member is wrapped with coils of wire. A magnetic field is generated and transferred to the disk media in accordance with disk drive write signals that are passed through the coils. By changing the polarity of the electric current passed through the coils, the polarity of the field generated is also changed. The pattern of such magnetic conditions is transferred to the surface of the disk media on disk platter 12 to form a pattern which comprises the resulting encoded version of the data to be retrieved at a later point.

Poles 17 are positioned very close to the surface of disk platter 12, and are maintained at a specified distance from the surface of the disk platter 12 by an air bearing. If there is contact, or if the distance between the surface of the disk platter 12 and the pole tips 17 becomes unacceptably small, there can be problems with the disk. The head or the disk media can be damaged, and errors can be encountered when retrieving the data and reading the data from the disk media.

Such contact between the pole tips and the disk media occurs when there is pole tip protrusion (PTP). PTP can be caused by high frequency writing which causes thermal expansion of the pole tips 17 due to, for example, the combined effects of eddy current heating and coil heating. Such PTP phenomena can cause problems while writing data onto the disk media, such as off track writing, due to frictional forces, as well as high servo PES (position error signal), because the pole tip is dragging the head. These effects could cause drive failure.

A write current duty cycle control mechanism may be provided to hinder PTP by controlling the write current duty cycle so as not to exceed a maximum level.

Figure 2:
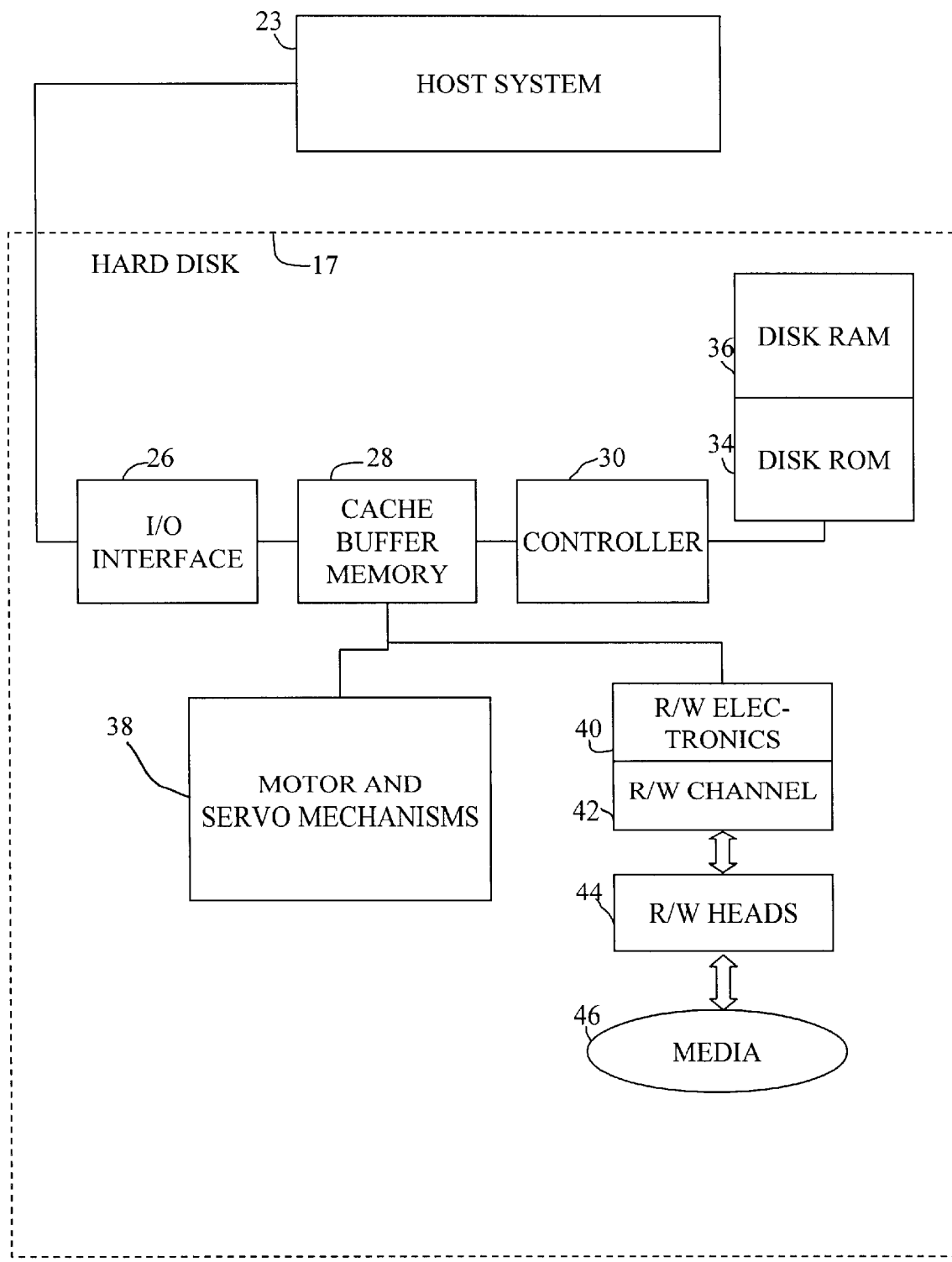
FIG. 2 is a block diagram of a personal computer system.

The write current duty cycle control mechanism may be implemented as part of a collection of the circuitry within the hard disk, e.g., as shown in FIG. 2 (below), including collectively the control portion, the hardware interaction circuitry, and the internal memory. More specifically, the write current duty cycle control mechanism may be implemented as part of the controller running software within internal ROM and/or RAM of the hard disk. Such a write current duty cycle control mechanism may also be implemented with circuitry provided as part of the read channel.

The write current duty cycle control mechanism may comprise a write current duty cycle monitor, a comparator to compare data representing the write current duty cycle to reference data, and a write cycle interrupter to interrupt the write cycle when the write current duty cycle exceeds a reference level as indicated by the reference data.

An exemplary embodiment is shown in FIG. 1. As shown, PTP can be prevented or hindered by monitoring the duty cycle of the write signal 18, using a counter 20. A compare and stop write operation mechanism 22 may be provided to compare the counter value (which counts the number of pulses over a predetermined time period) to a threshold value and to stop the write operation when the threshold value is exceeded. Write signal source 18, counter 20, and compare and stop write operation mechanisms may be provided as part of a read/write channel chip of the hard disk.

FIG. 2 is a block diagram of one embodiment of a personal computer system. The illustrated computer system has a hard disk 17. The illustrated hard disk 17 comprises, among other elements, disk media 46. In the illustrated embodiment, disk media 46 comprises magnetic media sputtered onto a metal substrate (the metal may be aluminum).

The illustrated computer system comprises a host system 23 and a hard disk 17. Hard disk 17 comprises a unitary hard disk housing which houses an input/output interface 26, a cache buffer memory 28, a controller 30, a RAM (random access memory) 36, and a ROM (read only memory) 34. Input/output interface 26 is connected to cache buffer memory 28, which is connected to controller 30. Each of the RAM and ROM portions 36, 34 is coupled to controller 30.

The hard disk housing further houses motor and servo mechanisms 38, read/write electronics 40, and a read channel 42. Read channel 42 is coupled to read/write heads 44, which interact with disk media 46. Read/write heads 44 and disk media 46 are also provided within the unitary hard disk housing (depicted with a schematic dotted line).

Input/output interface 26 may comprise a SCSI, IDE, or ADA interface, just to name a few examples. While a cache buffer memory 28 is not required, such is common.

In the embodiment, controller 22 serves as a control portion of the hard disk. Motor and servo control portions (not shown) of motor and servo mechanisms 38, read/write electronics 40, and read channel 42 collectively comprise hardware interaction circuitry coupling controller 30 to a head/disk assembly, which comprises a spindle motor (not shown), a servo (not shown), read/write heads 44, and disk media 46.

In the illustrated embodiment, hard disk 17, has in its housing, internal memory, including RAM 36 and ROM 34. All or a portion of such memory (and any other devices or mechanisms that may be provided in the hard disk and that serve as memory) may serve as the internal memory for the hard disk, and may contain information pertinent to the functions and operation of the hard disk.

Figure 3:
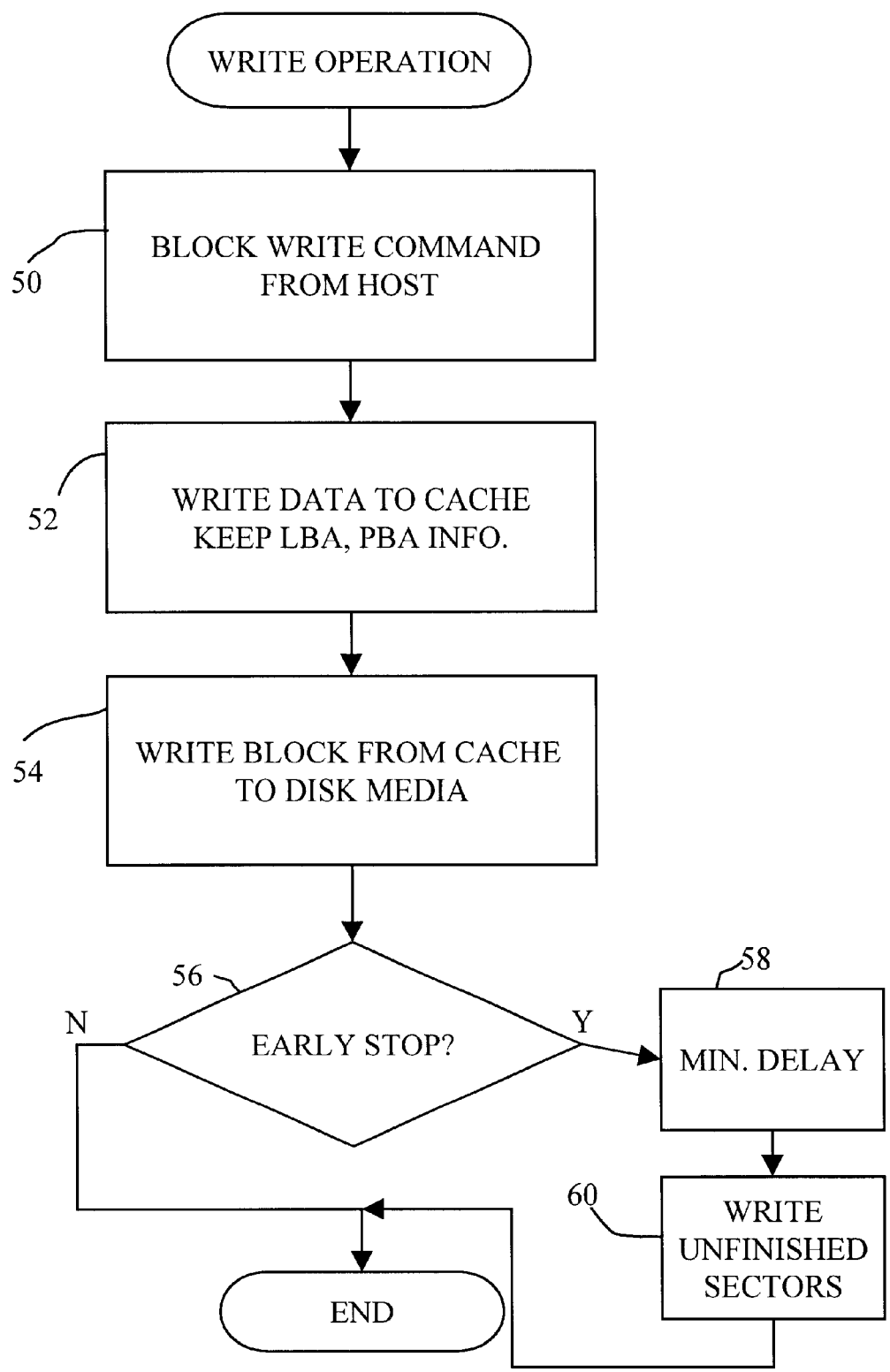
FIG. 3 is a flow chart of a write operation.

FIG. 3 shows a flow chart of a write operation. In act 50, a block write command is received by controller 30 from host 23. Then, in act 52, data is written from host 23 to cache 28, while keeping track of LBA (logical block address) and PBA (physical block address) information as appropriate.

In act 54, the block is written from cache 28 to the disk media. At act 56, a determination is made as to whether the write cycle was stopped early—e.g., because of a process for controlling the duty cycle of the write current (the process depicted in FIG. 4). If the write cycle was stopped early, the process proceeds to act 58, where the controller 30 will make sure a minimum delay passes before proceeding to act 60. At act 60, the write cycle is completed, by completing the writing of any unfinished sectors to the disk media.

The write operation is completed by proceeding from act 56 if the write cycle was not stopped early, or by proceeding from act 60.

Figure 4:
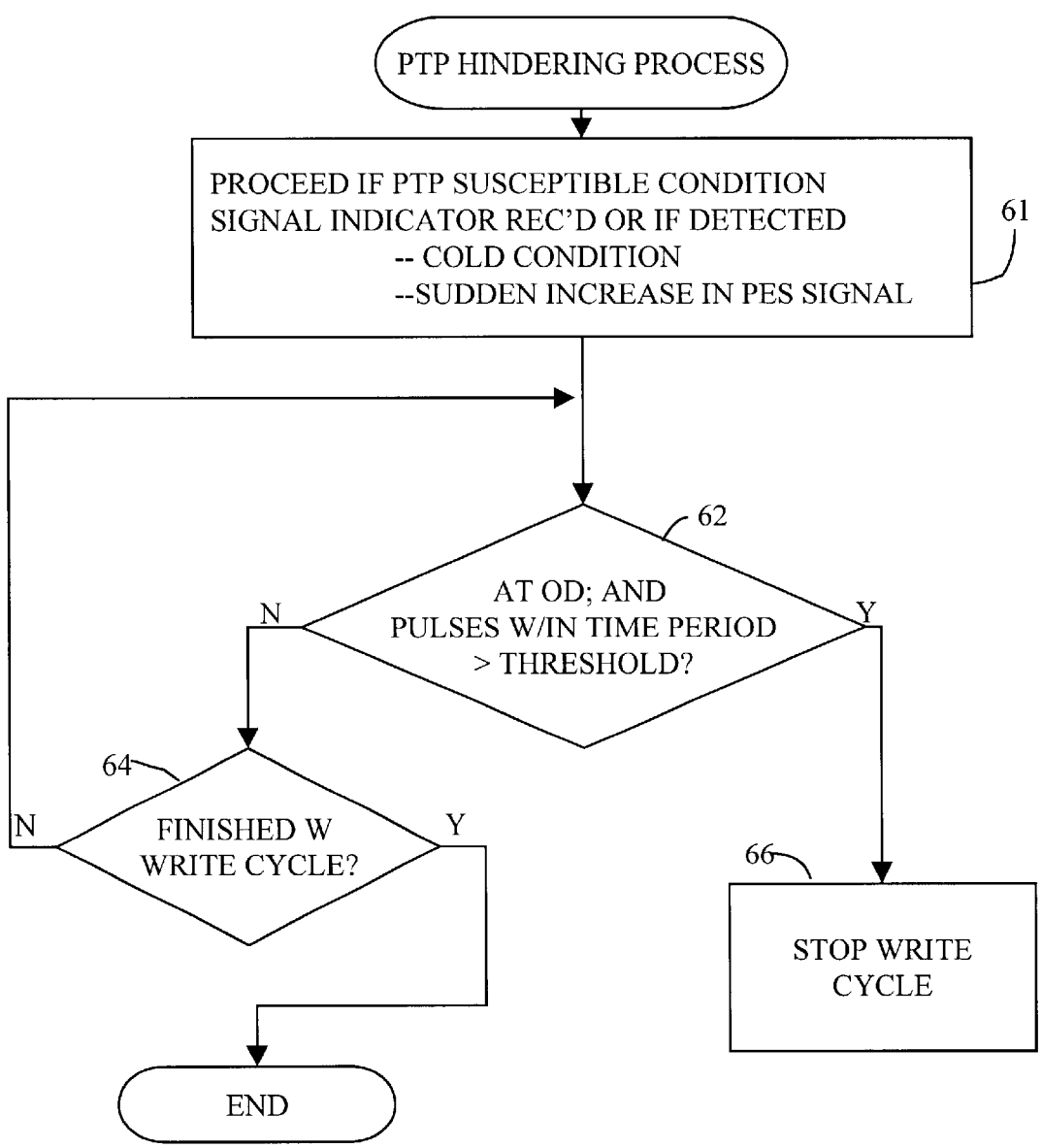
FIG. 4 is a flow chart of a PTP hindering process.

FIG. 4 shows one embodiment of a PTP hindering process, which allows the duty cycle of the write current to be controlled to hinder PTP effects in the write portions of the respective read/write heads of the hard disk. In an initial act 61, the process waits for certain PTP susceptibility conditions to exist, before proceeding. This act is an optional part of the illustrated embodiment. The conditions may be, e.g., the hard disk being in a cold condition or the detection of a sudden increase in the PES signal. Such condition(s) may be detected by a respective detector (not shown) or otherwise indicated by a signal received by the controller.

If the PTP susceptible condition exists, the process proceeds to act 62, where write operations at the outer diameter portion of the disk media (at the OD) are controlled. Specifically a determination is made at act 62 to determine if the duty cycle of the write current reaches a certain level. If the pulses counted within a given time period are greater than a threshold, then the process proceeds to act 66, where the write cycle is stopped. If the counted pulses do not exceed the threshold, the process proceeds to act 64, where a determination is made as to whether the write cycle is completed. If it is, the PTP hindering process is ended. If it is not, the process returns to act 62.

The determination at act 62 may perform a calculation of the duty cycle by comparing the number of pulses within a time period Td. If that number exceeds a given value, which can be determined empirically, then the duty cycle of the write current may be deemed likely to cause an undesired PTP effect on the write element of the read/write head.

Alternately, the duty cycle may be determined in act 62 to likely lead to undesired PTP by simply determining when the write operation is occurring with a constant intermittent duty write current lasting at least a given "PTP danger time." The PTP danger time may be deemed to be equal to a value somewhere in the range of 0.5 to 1.0 msec. In another embodiment the PTP danger time is a longer period, e.g., a value in the range of 2–100 msec.

For purposes of the disclosure herein, a computer-readable media may comprise any form of data storage mechanism, including temporary memory such as a RAM, or longer-term storage devices, including ROM, magnetic disks, rewritable optical disks, and so on. Computer-readable media can also comprise hardware or circuit representations of structures or data. The above described system and method embodiments can be implemented with software controlling a general purpose processor or with specialized processing components and circuitry.

While the invention has been described with reference to certain illustrated embodiments, the words which have been used herein are words of description, rather than words of limitation. Changes may be made, within the purview of the appended claims, without departing from the scope or spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. A personal computer magnetic disk drive with hindered pole tip protrusion (PTP), said magnetic drive comprising:
   an input/output interface for connection to a host computer;
   a control portion;
   internal memory comprising disk operation software and disk operation data;
   a head/disk assembly comprising motor and servo mechanisms, read write heads, and disk media; and
   hardware interaction circuitry coupling said control portion to said head/disk assembly; and
   a write current duty cycle control mechanism to hinder PTP, by controlling the write current duty cycle of a given one of the read write heads to not exceed a maximum level.

2. The magnetic disk drive according to claim 1, wherein said input/output interface comprises at least one of a SCSI interface and an ATA interface.

3. The magnetic disk drive according to claim 1, wherein said control portion comprises at least one of a microprocessor and a microcontroller.

4. The magnetic disk drive according to claim 1, wherein said control portion and said internal memory collectively comprise said write current duty cycle control mechanism.

5. The magnetic disk drive according to claim 1, wherein said write current duty cycle control mechanism further comprises a waiting mechanism to waits for a PTP susceptibility condition to exist, before controlling the write current duty cycle.

6. The magnetic disk drive according to claim 5, wherein said PTP susceptibility condition comprises one of the hard disk being in a cold condition or the detection of a sudden increase in the PES signal.

7. The magnetic disk drive according to claim 1, wherein said write current duty cycle control mechanism further comprises a mechanism to determine when a write cycle is at the outer diameter of a given platter of the disk media, and to determine when the duty cycle of the write current reaches a certain level while at the outer diameter of the given platter.

8. The magnetic disk drive according to claim 1, wherein the write current duty cycle control mechanism comprises a duty cycle determiner to determine a write current duty cycle of a write current of a given one of the read write heads, and a duty cycle controller to control the write current duty cycle to not exceed a maximum level.

9. The magnetic disk drive according to claim 8, wherein the duty cycle determiner comprises a write current duty cycle monitor and a comparator to compare data representing the write current duty cycle to reference data, and wherein the duty cycle controller comprises a write cycle interrupter to interrupt the write cycle when the write current duty cycle exceeds a reference level as indicated by the reference data.

10. The magnetic disk drive according to claim 9, further comprising a unitary hard disk housing, said control portion, internal memory, head/disk assembly, and hardware interaction circuitry all being entirely in said housing.

11. The magnetic disk drive according to claim 8, wherein the duty cycle determiner comprises a counter to produce a counter value indicative of a quantity of pulses in the write current over a predetermined period of time, and wherein the duty cycle controller comprises a compare and stop write operation mechanism to compare the counter value to a threshold value and to stop the write operation when the threshold value is exceeded.

12. A method for hindering pole tip protrusion in a magnetic disk drive, the method comprising:
   counting a duty cycle of a write current of a read write head and storing a count value; and
   when the count value nears a maximum reference level, modifying the write current to limit the duty cycle.

13. The method according to claim 12, wherein the modifying comprises interrupting a write cycle when the count value is above the maximum reference level.

14. The method according to claim 12, further comprising determining when a pole tip protrusion susceptible condition exists and controlling the write current duty cycle when the pole tip protrusion susceptible condition exists.

15. The method according to claim 14, wherein the pole tip protrusion susceptible condition comprises the hard disk being in a cold environment.

16. The method according to claim 14, wherein the pole tip protrusion susceptible condition comprises a sudden increase in a position error signal (PES).

17. Apparatus for hindering pole tip protrusion in a magnetic disk drive, the apparatus comprising:
   a counter to count a number of pulses in a write signal of a read write head over a predetermined period of time and to produce a count value;
   a comparator to compare the count value to a maximum reference level; and
   a write signal interrupter to interrupt the write signal when the count value exceeds the maximum reference level.

18. Apparatus according to claim 17, further comprising a magnetic disk drive.

19. Apparatus according to claim 18, further comprising a read channel, the read channel comprising the counter, the comparator, and the write signal interrupter.

20. Apparatus according to claim 17, further comprising a pole tip protrusion susceptible condition signaler to signal when a pole tip protrusion susceptible condition exists before controlling the write current duty cycle.

21. Apparatus according to claim 20, wherein the pole tip protrusion susceptible condition comprises the magnetic disk drive being in a cold environment.

22. Apparatus according to claim 20, wherein the pole tip protrusion susceptible condition comprises a sudden increase in a PES signal.

23. A machine-readable medium comprising encoded information, the encoded information, when operably interacting with a machine, causing:
   counting a duty cycle of a write signal of a read write head of a magnetic disk drive, to produce a count value; and
   comparing the count value to a maximum reference level.

24. The machine-readable medium according to claim 23, the encoded information further causing the write signal to be interrupted when the count value is above the maximum reference level.

25. The machine-readable medium according to claim 23, the encoded information further causing determining when a pole tip protrusion susceptible condition exists, wherein the count value is compared to the maximum reference level when the pole tip protrusion susceptible condition is determined to exist.

26. The machine-readable medium according to claim 25, wherein the pole tip protrusion susceptible condition comprises the hard disk being in a cold environment.

27. The machine-readable medium according to claim 25, wherein the pole tip protrusion susceptible condition comprises a sudden increase in a position error signal (PES).

28. A method for hindering pole tip protrusion in a magnetic disk drive, the method comprising:
- determining when a duty cycle of a write current of a read write head is at a constant intermittent level; and
- determining when the duty cycle of the write current remains at the constant intermittent level for at least a PTP danger time.

29. The method according to claim 28, wherein the duty cycle of the write current is determined by a counter counting a number of pulses of the write current over a predetermined period of time.

30. The method according to claim 28, further comprising interrupting the write current when the duty cycle is constantly intermittent for at least the PTP danger time.

31. The method according to claim 30, further comprising determining when a pole tip protrusion susceptible condition exists and delaying interruption of the write current until the pole tip protrusion susceptible condition exists.

32. The method according to claim 31, wherein the pole tip protrusion condition comprises the hard disk being in a cold environment.

33. The method according to claim 31, wherein the pole tip protrusion condition comprises a sudden increase in a position error signal (PES).

34. Apparatus for hindering pole tip protrusion in a magnetic disk drive, the apparatus comprising:
- a constant intermittent determination mechanism to determine when a write signal of a read write head is at a constant intermittent level;
- a duration determining mechanism to determine when the duty cycle remains at the constant intermittent level for at least a PTP danger time; and
- a write cycle interrupter to interrupt the write cycle when the duty cycle is constantly intermittent for at least the PTP danger time.

35. Apparatus according to claim 34, further comprising a magnetic disk drive.

36. Apparatus according to claim 35, further comprising a read channel, the read channel comprising the constant intermittent determination mechanism, the duration determination mechanism, and the write cycle interrupter.

37. Apparatus to claim 34, further comprising a pole tip protrusion susceptible condition indicator to indicate when a pole tip protrusion exists.

38. Apparatus according to claim 37, wherein the pole tip protrusion susceptible condition comprises the hard disk being in a cold environment.

39. Apparatus according to claim 37, wherein the pole tip protrusion susceptible condition comprises a sudden increase in a PES signal.

40. A machine-readable medium comprising encoded information, the encoded information, when operably interacting with a machine, causing:
- determining when a duty cycle of a write current of a read write head of a magnetic disk drive is at a constant intermittent level; and
- determining when the duty cycle of the write current remains at the constant intermittent level for at least a PTP danger time.

41. The machine-readable medium according to claim 40, wherein the duty cycle of the write current is determined by a counter counting a number of pulses of the write current over a predetermined period of time.

42. The machine-readable medium according to claim 40, further comprising interrupting the write current when the duty cycle is constantly intermittent for at least the PTP danger time.

43. The machine-readable medium according to claim 40, further comprising determining when a pole tip protrusion susceptible condition exists and delaying interruption of the write current until the pole tip protrusion susceptible condition exists.

44. The machine-readable medium according to claim 43, wherein a pole tip protrusion susceptible condition comprises the hard disk being in a cold environment.

45. The machine-readable medium according to claim 43, wherein a pole tip protrusion susceptible condition comprises a sudden increase in a position error signal (PES).

* * * * *